United States Patent
Suzuki et al.

(10) Patent No.: US 10,031,382 B2
(45) Date of Patent: Jul. 24, 2018

(54) LIQUID CRYSTAL DISPLAY DEVICE

(71) Applicant: Japan Display Inc., Minato-ku (JP)

(72) Inventors: Daiichi Suzuki, Tokyo (JP); Yoshifumi Saeki, Tokyo (JP); Yukio Tanaka, Tokyo (JP); Noboru Kunimatsu, Tokyo (JP); Hidehiro Sonoda, Tokyo (JP); Masahiro Kosuge, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/389,941

(22) Filed: Dec. 23, 2016

(65) Prior Publication Data

US 2017/0184929 A1    Jun. 29, 2017

(30) Foreign Application Priority Data

Dec. 25, 2015  (JP) ................... 2015-254120

(51) Int. Cl.
   *G02F 1/1343*  (2006.01)
   *G02F 1/133*   (2006.01)
   *G02F 1/1337*  (2006.01)

(52) U.S. Cl.
   CPC ...... *G02F 1/134363* (2013.01); *G02F 1/1337* (2013.01); *G02F 1/13306* (2013.01); *G02F 2001/134372* (2013.01); *G02F 2201/121* (2013.01); *G02F 2201/123* (2013.01)

(58) Field of Classification Search
   None
   See application file for complete search history.

(56) References Cited

U.S. PATENT DOCUMENTS

| | | | |
|---|---|---|---|
| 2009/0053430 A1* | 2/2009 | Matsumori | G02F 1/133723 428/1.25 |
| 2010/0066961 A1* | 3/2010 | Matsui | G02F 1/133723 349/129 |
| 2011/0199565 A1* | 8/2011 | Kunimatsu | G02F 1/133723 349/123 |
| 2014/0132870 A1* | 5/2014 | Kubota | G02F 1/1396 349/43 |
| 2014/0347588 A1* | 11/2014 | Hatsumi | G02F 1/134363 349/43 |
| 2015/0102988 A1 | 4/2015 | Suzuki et al. | |
| 2015/0177539 A1* | 6/2015 | Shen | C09K 19/56 349/124 |
| 2016/0026044 A1* | 1/2016 | Nam | G02F 1/1368 349/42 |
| 2017/0236942 A1* | 8/2017 | Endo | H01L 29/7869 257/43 |

FOREIGN PATENT DOCUMENTS

JP    2004-264354    9/2004

* cited by examiner

*Primary Examiner* — James Dudek
(74) *Attorney, Agent, or Firm* — Oblon, McClelland, Maier & Neustadt, L.L.P.

(57) ABSTRACT

According to one embodiment, a liquid crystal display device includes a liquid crystal display panel which includes a pixel electrode, a liquid crystal layer and an alignment film, and a driver. The driver drives the pixel electrode at a drive frequency of 1 to 20 Hz. The alignment film has a resistivity of $5 \times 10^{14}$ Ω·cm or more.

6 Claims, 5 Drawing Sheets

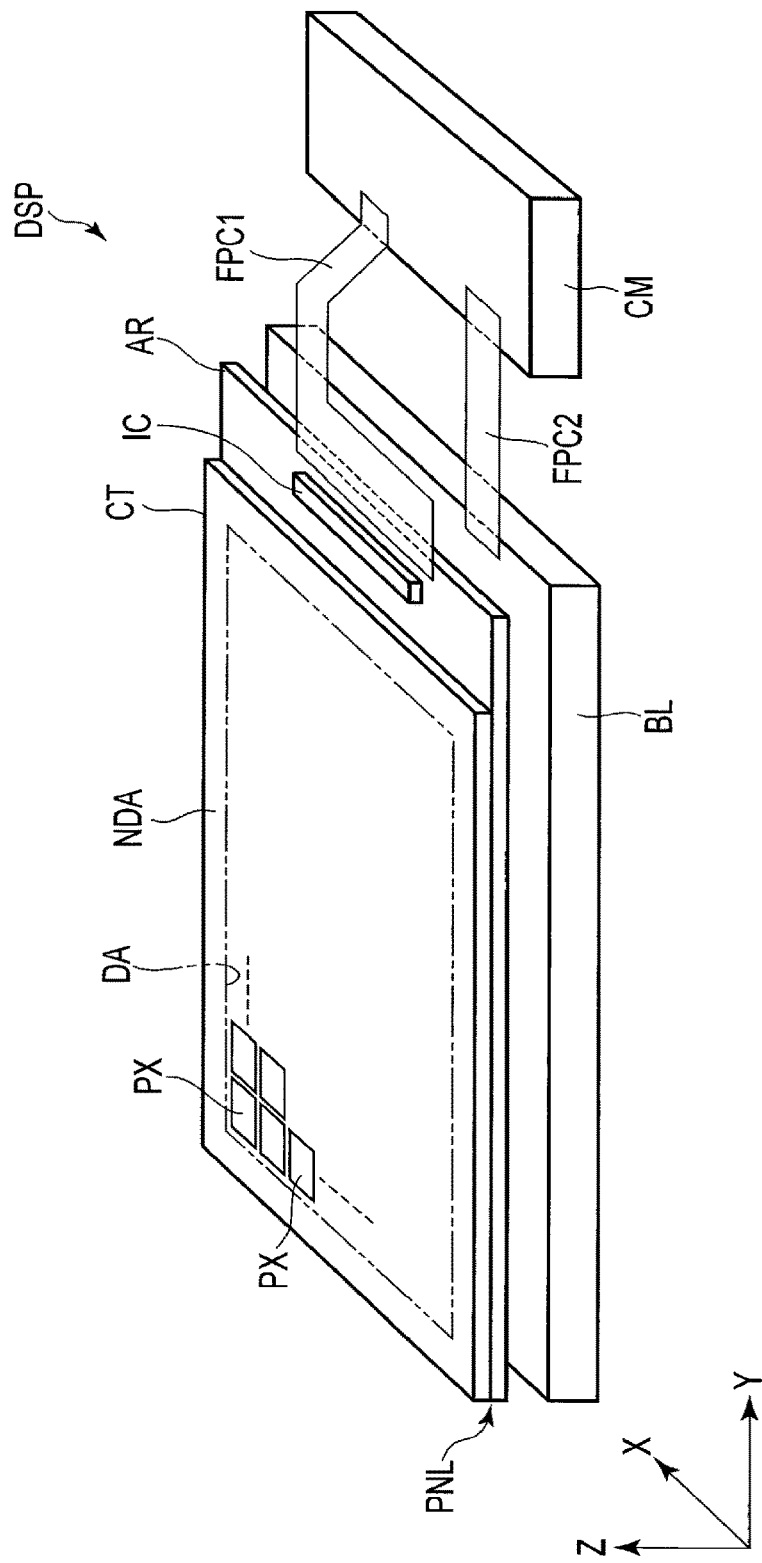
F I G. 1

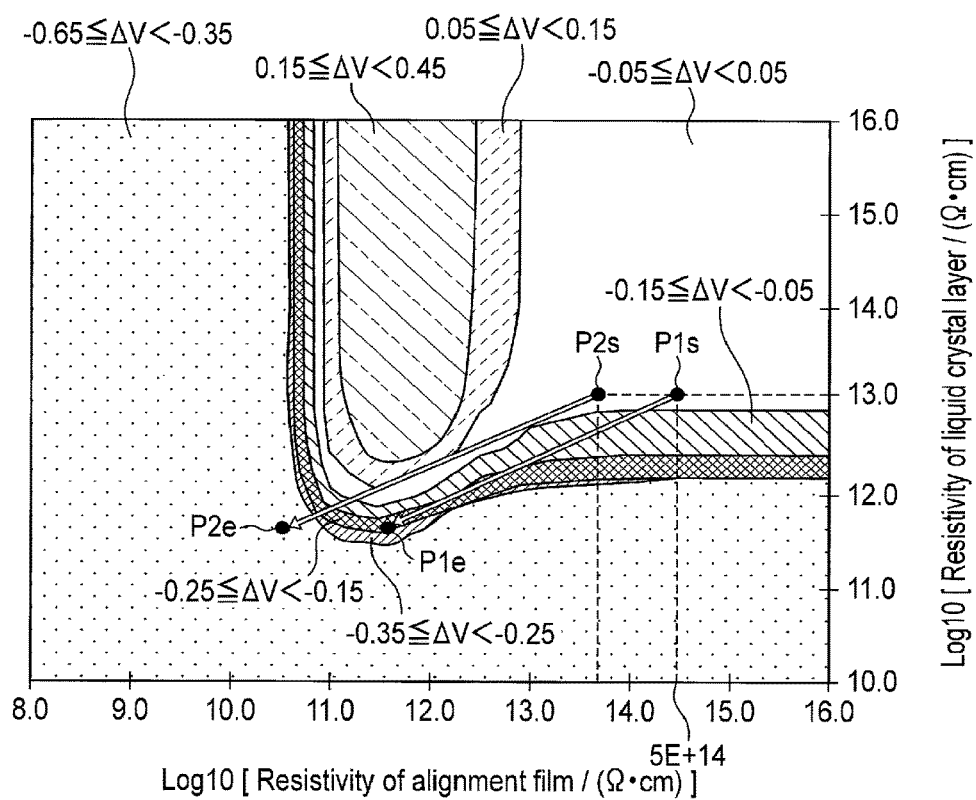
F I G. 5

|  | | Example 2 | Comparative example 2 |
|---|---|---|---|
| Backlight unit driven | Liquid crystal display panel driven | Brightness not non-uniform | Brightness non-uniform |
| | Liquid crystal display panel not driven | Brightness not non-uniform | Brightness non-uniform |
| Backlight unit not driven | Liquid crystal display panel driven | Brightness not non-uniform | Brightness not non-uniform |
| | Liquid crystal display panel not driven | Brightness not non-uniform | Brightness not non-uniform |

F I G. 6

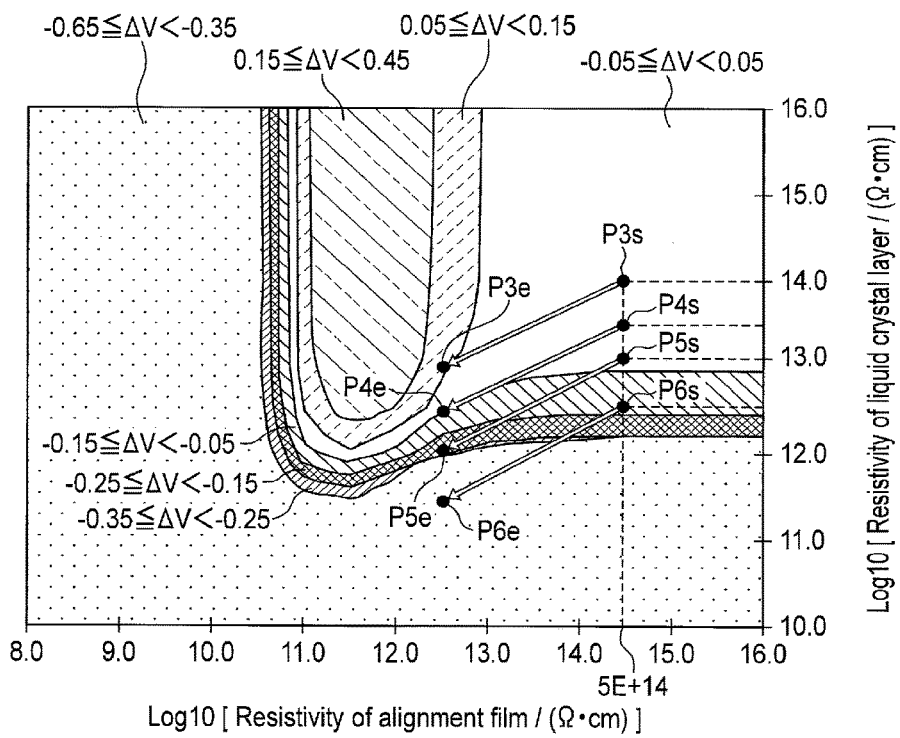

F I G. 7

LIQUID CRYSTAL DISPLAY DEVICE

CROSS-REFERENCE TO RELATED APPLICATIONS

This application is based upon and claims the benefit of priority from Japanese Patent Application No. 2015-254120, filed Dec. 25, 2015, the entire contents of which are incorporated herein by reference.

FIELD

Embodiments described herein relate generally to a liquid crystal display device.

BACKGROUND

Liquid crystal display devices are mounted on various apparatuses and devices such as a television receiver, an in-vehicle display, for example, car navigation equipment, a notebook computer, a tablet computer and mobile devices such as a cell phone and a smartphone.

Such liquid crystal display devices employ liquid crystals whose modes vary in accordance with intended purposes.

For example, in a liquid crystal display device which is of a vertical-electric-field type such as a twisted nematic (TN) mode or an optically compensated bend (OCB) mode, the alignment direction of liquid crystal molecules contained in a liquid crystal layer held between a common electrode provided in an upper substrate and pixel electrodes provided in a lower substrate is controlled by an electric field produced between the common electrode and the pixel electrodes.

In a liquid crystal display device which is of a lateral-electric-field type such as an in-plane switching (IPS) mode, a common electrode and pixel electrodes are provided in a single substrate only, and the alignment direction of liquid crystal molecules contained in a liquid crystal layer is controlled by an electric field (fringing field) produced between the common electrode and the pixel electrodes. A liquid crystal display device adapted for a fringe-field switching (FFS) mode which is one mode of the IPS mode can ensure a great aperture ratio, and thus has a high brightness and a superior viewing angle characteristic.

It should be noted that liquid crystal display devices applied to mobile terminals are strongly required to reduce a circuit power consumption. As means for reducing the power consumption, a low-frequency driving is proposed. The low-frequency driving is a drive in which the drive frequency of a liquid crystal display device is reduced to, for example, ½ or ¼ of the drive frequency of a drive to be performed under standard conditions, to thereby reduce a circuit power consumption. The low-frequency driving is not suitable for displaying of moving images, since the intervals at which an image signal is written to a pixel electrode are long. On the other hand, in the case of displaying a still image, for example, in a display operation in which importance is not attached to visibility of moving images, the low-frequency driving is an advantageous countermeasure for reducing the circuit power consumption. However, in the case where the low-frequency driving is performed in a liquid crystal display device, it is necessary to reduce flicker.

BRIEF DESCRIPTION OF THE DRAWING

FIG. 1 is a perspective view illustrating a structure of a liquid crystal display device according to an embodiment.

FIG. 5 is a graph indicating (1) how the resistivities of an alignment film and a liquid crystal layer of the liquid crystal display device according to example 1 of the embodiment varied, and (2) how the resistivities of an alignment film and a liquid crystal layer of a liquid crystal display device of comparative example 1 varied.

FIG. 6 is a view indicating as a table whether the brightness of the display became non-uniform or not with respect to each of the liquid crystal display device according to example 2 of the embodiment and the liquid crystal display device of comparative example 2, in connection with the drive state of a backlight unit and the drive state of a liquid crystal display panel.

FIG. 7 is a graph indicating (1) how the resistivities of an alignment film and a liquid crystal layer of the liquid crystal display device according to example 3 of the embodiment varied, and (2) how the resistivities of an alignment film and a liquid crystal layer of a liquid crystal display device of comparative example 3 varied.

DETAILED DESCRIPTION

Figure 2:
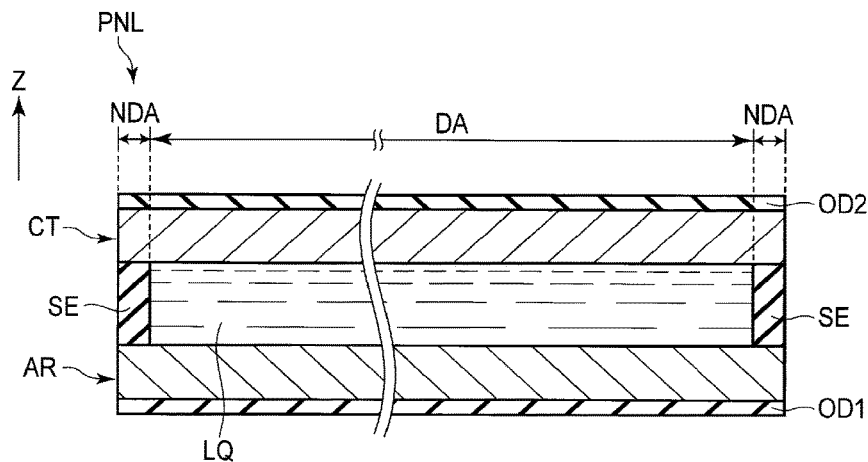
FIG. 2 is a cross-sectional view of a liquid crystal display panel as illustrated in FIG. 1.

In general, according to one embodiment, there is provided a liquid crystal display device comprising: a liquid crystal display panel which includes a pixel electrode, a liquid crystal layer and an alignment film which is located between the pixel electrode and the liquid crystal layer, and which is in contact with the liquid crystal layer; and a driver which drives the pixel electrode at a drive frequency of 1 to 20 Hz. The alignment film has a resistivity of $5\times10^{14}$ Ω·cm or more.

An embodiment will be described hereinafter with reference to the accompanying drawings. The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

A liquid crystal display device according to an embodiment will be described in detail.

FIG. 1 is a perspective view illustrating the configuration of a liquid crystal display device DSP. In the embodiment, a first direction X and a second direction Y are perpendicular to each other; however, they may intersect each other at an angle other than 90°. Also, a third direction Z is perpendicular to each of the first direction X and the second direction Y.

As illustrated in FIG. 1, the liquid crystal display device DSP comprises an active-matrix liquid crystal display panel PNL, a driver IC IC which drives the liquid crystal display panel PNL, a backlight unit BL which illuminates the liquid crystal display panel PNL, a control module CM, flexible printed circuits FPC1 and FPC2, etc.

The liquid crystal display panel PNL comprises an array substrate AR and a counter-substrate CT located opposite to the array substrate AR. The liquid crystal display panel PNL includes a display area DA which displays an image and a non-display area NDA which is formed in the shape of a frame in such a way as to surround the display area DA. The liquid crystal display panel PNL comprises a plurality of pixels PX arranged in a matrix in the first direction X and the second direction Y in the display area DA.

The backlight unit BL is provided on a rear surface of the array substrate AR. As the structure of the backlight unit BL, various structures can be applied. However, a detailed explanation of the structure of the backlight unit BL will be omitted. The driver IC IC is mounted on the array substrate AR. The flexible printed circuit FPC1 couples the liquid crystal display panel PNL and the control module CM to each other. The flexible printed circuit FPC2 couples the backlight unit BL and the control module CM to each other.

The liquid crystal display device DSP having the above structure corresponds to a transmissive liquid crystal display device in which pixels PX are selectively caused to transmit light incident from the backlight unit BL onto the liquid crystal display panel PNL, to thereby display an image. However, the liquid crystal display device DSP may be a reflective liquid crystal display device in which pixels PX are selectively caused to reflect external light traveling from the outside toward the liquid crystal display panel PNL, to thereby display an image, or it may be a transreflective liquid crystal display device having both the functions of transmissive and reflective liquid crystal display devices.

FIG. 2 is a cross-sectional view illustrating the liquid crystal display panel PNL.

As illustrated in FIG. 2, the liquid crystal display panel PNL comprises the array substrate AR, the counter-substrate CT, a liquid crystal layer LQ, a sealing member SE, a first optical element OD1, a second optical element OD2, etc. The array substrate AR and the counter-substrate CT will be described later in detail.

The sealing member SE is located in the non-display area NDA, and joins the array substrate AR and the counter-substrate CT to each other. The liquid crystal layer LQ is held between the array substrate AR and the counter-substrate CT. The first optical element OD1 and the liquid crystal layer LQ are located on opposite sides of the array substrate AR, respectively; that is, they are located opposite to each other with respect to the array substrate AR. The second optical element OD2 and the liquid crystal layer LQ are located on opposite sides of the counter-substrate CT, respectively; that is, they are located opposite to each other with respect to the counter-substrate CT. The first optical element OD1 and the second optical element OD2 each include a polarizer. It should be noted that each of the first optical element OD1 and the second optical element OD2 may include another optical element such as a retardation film.

Figure 4:
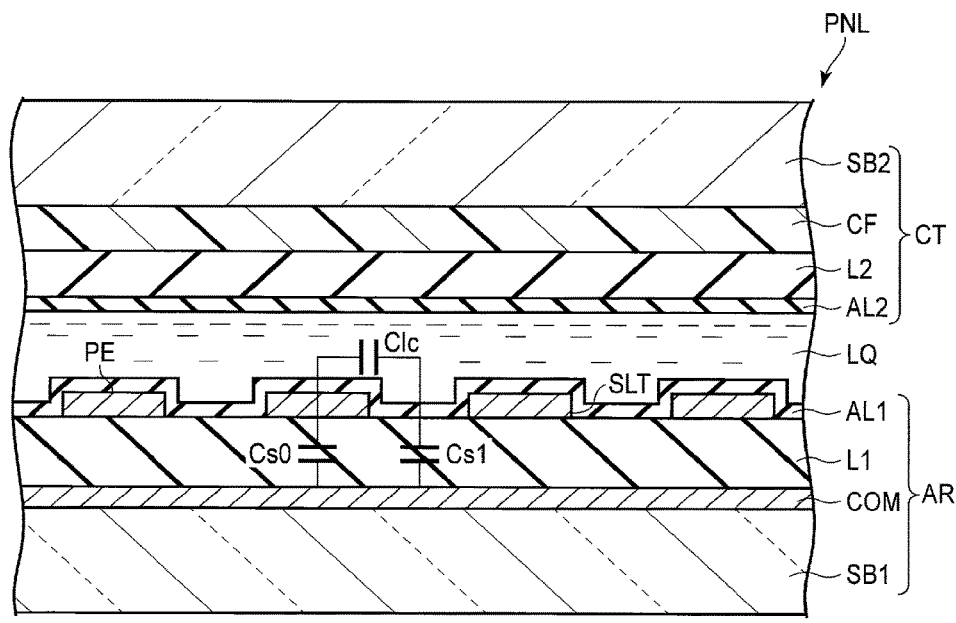
FIG. 4 is a cross-sectional view illustrating part of the liquid crystal display panel.
Figure 3:
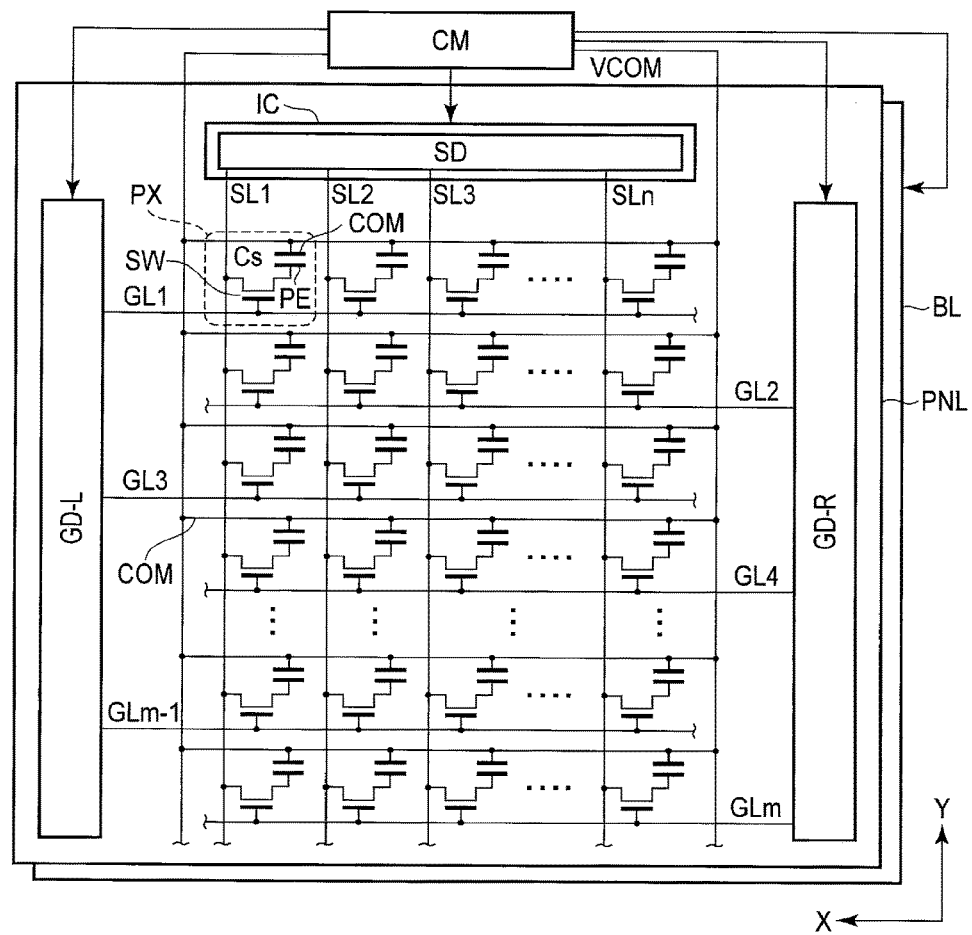
FIG. 3 is a plan view illustrating a configuration of the liquid crystal display device.

FIG. 3 is a plan view illustrating a configuration of the liquid crystal display device DSP. FIG. 4 is a cross-sectional view illustrating part of the liquid crystal display panel PNL. These figures illustrate only main portions which need to be referred to in the following explanations.

As illustrated in FIGS. 3 and 4, the counter-substrate CT comprises a transparent insulating substrate SB2, a color filter CF, an overcoat layer L2 and an alignment film AL2. The color filter CF includes red (R), green (G) and blue (B) colored layers which are provided on the insulating substrate SB2. The overcoat layer L2 is provided to cover the color filter CF, and prevents a substance contained in the color filter CF from entering the liquid crystal layer LQ. The alignment film AL2 is located opposite to the array substrate AR and in contact with the liquid crystal layer LQ. In the embodiment, the liquid crystal layer LQ is formed of a negative liquid crystal material.

The array substrate AR comprises an insulating substrate SB1, a common electrode (counter-electrode) COM, an insulating layer L1, pixel electrodes PE and an alignment film AL1. The pixel electrodes PE are provided on the insulating layer L1, which is formed of silicon nitride (SiN) or the like, and are also provided opposite to the common electrode COM. Furthermore, the pixel electrodes PE are provided in respective pixels PX, and include slit-like openings SLT. The common electrode COM is located opposite to the alignment film AL1 with respect to the pixel electrodes PE. The common electrode COM and the pixel electrodes PE are formed of, for example, indium tin oxide (ITO) which is a transparent conductive material. One of sides of the alignment film AL1 is in contact with the pixel electrodes PE, and the other is in contact with the liquid crystal layer LQ.

The array substrate AR comprises scanning lines GL (GL1, GL2, . . . ) extending in a first direction X, signal lines SL (SL1, SL2, . . . ) extending in a second direction Y, and pixel switches SW provided close to intersections of the scanning lines GL and the signal lines SL, the first direction X and the second direction Y being directions in which the pixels PX are arranged.

The pixel switches SW comprise thin-film transistors (TFTs). A first electrode of each of the pixel switches SW is electrically connected to an associated scanning line GL. A second electrode of each pixel switch SW is electrically connected to an associated signal line SL. A third electrode of each pixel switch SW is electrically connected to an associated pixel electrode PE. In the embodiment, the first electrode functions as a gate electrode, one of the second and third electrodes functions as a source electrode, and the other functions as a drain electrode.

The driver IC IC includes a signal-line drive circuit SD. The array substrate AR includes scanning-line drive circuits GD (left scanning-line drive circuit GD-L and right scanning-line drive circuit GD-R). The scanning lines GL are electrically connected to output terminals of the scanning-line drive circuits GD. The signal lines SL are electrically connected to output terminals of the signal-line drive circuit SD. The scanning-line drive circuits GD, the driver IC IC (signal-line drive circuit SD) and the control module CM function as a drive unit which drives the pixels PX.

The scanning-line drive circuits GD and the driver IC IC are provided in the non-display area NDA. The scanning-line drive circuits GD apply on-voltages to the scanning lines GL in turn such that the gate electrode of a pixel switch SW electrically connected to a selected scanning line GL is given an on-voltage. The source electrode and drain electrode of the pixel switch SW the gate electrode of which is given the on-voltage are electrically connected to each other. The signal-line drive circuit SD supplies output signals to the signal lines SL, respectively. Through the pixel switch SW whose source and drain electrodes are electrically connected to each other, an output signal supplied to an associated signal line SL is supplied to an associated pixel electrode PE.

The operations of the scanning-line drive circuits GD and signal-line drive circuit SD are controlled by the control module CM, which is provided outside the liquid crystal display panel PNL. Also, the control module CM applies a common voltage Vcom to the common electrode COM. Furthermore, the control module CM controls the operation of the backlight unit BL.

The control module CM has a function of performing a low-frequency driving to reduce a drive power, in addition to an ordinary driving. It should be noted that a time period in which an image signal (video signal) to a single pixel electrode PE is subjected to rewrite processing is referred to as a single frame period, and the reciprocal thereof is referred to as the drive frequency or the frame frequency. It is assumed that this is true of an intermittent driving.

It is assumed by way of example that a standard frame frequency of the liquid crystal display device DSP is 60 Hz (that is, an image signal to a pixel PX is subjected to rewrite processing every $1/60$ s). In the case where the liquid crystal display device DSP displays moving images, it operates at 60 Hz. On the other hand, in a display operation in which importance is not attached to visibility of moving images, for example, in the case of displaying a still image, the drive unit, for example, the control module CM, executes the low-frequency driving.

The drive unit, for example, the control module CM, performs a write operation of one frame (scanning a screen from top to bottom) for $1/60$ s, and then enter an idle period of, for example, $2/60$, $3/60$, $4/60$, $5/60$, $9/60$, $11/60$, $14/60$, $19/60$, $29/60$ or $59/60$ s. In the idle period, the write operation of the control module CM is stopped, as a result of which the power consumption is substantially zero. Thus, the hourly average of the power consumption of a circuit operation of the control module CM, which includes the write operation, is reduced to $1/3$ to $1/60$.

That is, in the embodiment, when the drive unit drives a single pixel electrode PE, a drive frequency at which it drives the pixel electrode PE falls within the range of 1 to 20 Hz.

The liquid crystal display device DSP according to the embodiment is a liquid crystal display device adapted for a fringe-field switching (FFS) mode in which an electric field is produced in the liquid crystal layer LQ because of the potential difference between the common electrode COM and the pixel electrodes PE, to thereby control an alignment direction of liquid crystal molecules in the liquid crystal layer LQ. With respect to light emitted from the backlight unit BL, the amount of light transmitted through the liquid crystal layer LQ is controlled by controlling the alignment direction of the liquid crystal molecules.

Each of the pixel electrodes PE, the common electrode COM and the insulating layer L1 produce a capacitance component Cs0. In addition, a liquid crystal capacitance Clc and an auxiliary capacitance component Cs1 corresponding to an electric field produced in the liquid crystal layer LQ are also present. A total capacitance Cs which is present between the pixel electrodes PE and the common electrode COM can be expressed as such an equivalent circuit as illustrated in FIG. 3.

Next, it will be explained how the above liquid crystal display device DSP adapted for the FFS mode operates during its display drive operation for displaying an image.

First of all, an off state in which no voltage is applied to the liquid crystal layer LQ will be explained. The off state corresponds to a state in which a potential difference is not made between a pixel electrode PE and the common electrode COM. In such an off state, liquid crystal molecules in the liquid crystal layer LQ are initially aligned in a single direction in the X-Y plane by alignment forces of the alignment film AL1 and alignment film AL2. Part of light emitted from the backlight unit BL is transmitted through the polarizer of the first optical element OD1, and then incident on the liquid crystal display panel PNL. The light incident on the liquid crystal display panel PNL is linear polarized light perpendicular to an absorption axis of the polarizer. The polarized state of such linear polarized light hardly changes when the light passes through the liquid crystal display panel PNL in the case where the liquid crystal display panel PNL is in the off state. Thus, most of the linear polarized light which has passed through the liquid crystal display panel PNL is absorbed by the polarizer of the second optical element OD2 (black display). A mode in which in the off state, the liquid crystal display panel PNL makes black display is referred to as a normally-black mode.

Then, an on state in which a voltage is applied to the liquid crystal layer LQ will be explained. The on state corresponds to a state in which a potential difference is made between the pixel electrode PE and the common electrode COM. To be more specific, to the common electrode COM, a common voltage Vcom is applied. By contrast, the pixel electrode PE is supplied with such an image signal (for example, a video signal) as makes the potential difference with respect to the common voltage. As a result, in the on state, a fringing field is produced between the pixel electrode PE and the common electrode COM.

In such an on state, in the X-Y plane, liquid crystal molecules are aligned in a direction different from that in their initial alignment state. In the on state, linear polarized light perpendicular to the absorption axis of the polarizer of the first optical element OD1 is incident on the liquid crystal display panel PNL, and its polarized state varies in the alignment state of the liquid crystal molecules when it passes through the liquid crystal layer LQ. Thus, in the on state, at least part of the light which has passed through the liquid crystal layer LQ also passes through the polarizer of the second optical element OD2 (white display).

As described above, as an advantage, it is possible to reduce the circuit power consumption, by applying the low-frequency driving to decrease the number of writes to the pixel electrode PE (the number of times the state of the pixel switch SW is switched from the off state to the on state).

By contrast, in the low-frequency driving, a holding period in a single frame period is longer than that in a 60-Hz drive which is a regular drive. Thus, because of an increase in the holding period, a voltage applied to the liquid crystal layer LQ lowers, and flicker easily occurs. As the cause of lowering of the voltage applied to the liquid crystal layer LQ in the holding period, it can be considered that a voltage holding rate is reduced, or the impedance of the liquid crystal layer LQ and that of the alignment film AL1 (alignment film AL2) do not match.

According to the result of an experiment conducted by the inventors, reduction of the holding rate of a voltage applied between the pixel electrodes PE and the common electrode COM and the above impedance mismatch occurred during reliability tests (a high-temperature and high-humidity exposure reliability test, a high-temperature operation reliability test, etc.), and it was found that they occurred because of (1) entrance of water from the outside of the liquid crystal display panel PNL thereinto and (2) continuous illumination of the liquid crystal display panel PNL with light from the backlight unit.

By contrast, according to the embodiment, it is possible to obtain a liquid crystal display device DSP which can reduce occurrence of flicker even when an image is displayed in the low-frequency driving. By way of illustration, the following explanations are made with respect to examples 1 to 3 of such a liquid crystal display device DSP as explained above.

EXAMPLE 1

The liquid crystal display device DSP of example 1 will be described. FIG. 5 is a graph indicating (1) how the resistivities of an alignment film AL1 and a liquid crystal layer LQ of the liquid crystal display device DSP of example 1 varied, and (2) how the resistivities of an alignment film and a liquid crystal layer of a liquid crystal display device of comparative example 1 varied. To be more specific, FIG. 5 indicates how the resistivies of the alignment films and liquid crystal layers varied in the high-temperature and high-humidity exposure reliability test. The high-temperature and high-humidity exposure reliability test is a test in which the liquid crystal display device DSP is put in an atmosphere having a temperature of 65° C. and a humidity of 90% for 500 hours to examine the resistivity of the alignment film, that of the liquid crystal layer and a voltage variation ΔV to be described later. It should be noted that the liquid crystal display device of comparative example 1 has the same structure as example 1 of the liquid crystal display device, except for the resistivity of the alignment film.

As illustrated in FIG. 5, points P1$s$, P1$e$, P2$s$ and P2$e$ are plotted.

Point P1$s$ is a point indicating both the resistivities of the alignment film AL1 and the liquid crystal layer LQ of example 1 immediately before the high-temperature and high-humidity exposure reliability test (i.e., point P1$s$ is a point of intersection of a line vertically extending from a value on the horizontal axis of the graph which corresponds to the resistivity of the alignment film AL1 of example 1 immediately before the high-temperature and high-humidity exposure reliability test and a line horizontally extending from a value on the vertical axis of the graph which corresponds to the resistivity of the liquid crystal layer LQ of example 1 immediately before the high-temperature and high-humidity exposure reliability test). In other words, point P1$s$ is a point indicating both the resistivities of the alignment film AL1 and the liquid crystal layer LQ of example 1 immediately after manufacturing of the liquid crystal display device DSP of example 1 (i.e., point P1$s$ is a point of intersection of a line vertically extending from a value on the horizontal axis of the graph which corresponds to the resistivity of the alignment film AL1 of example 1 immediately after manufacturing of the liquid crystal display device of DSP of example 1 and a line horizontally extending from a value on the vertical axis of the graph which corresponds to the resistivity of the liquid crystal layer LQ of example 1 immediately after manufacturing of the liquid crystal display device of DSP of example 1). Thus, point P1$s$ indicates initial resistivities of the alignment film AL1 and the liquid crystal layer LQ of example 1.

In example 1, the initial resistivity of the alignment film AL1 is $5\times10^{14}$ Ω·cm, and that of the liquid crystal layer LQ is $1\times10^{13}$ Ω·cm. Also, in example 1, the alignment film AL2 is formed in the same manner as the alignment film AL1.

Point P1$e$ is a point indicating both the resistivities of the alignment film AL1 and the liquid crystal layer LQ of example 1 immediately after the high-temperature and high-humidity exposure reliability test (i.e., point P1$e$ is a point of intersection of a line vertically extending from a value on the horizontal axis of the graph which corresponds to the resistivity of the alignment film AL1 of example 1 immediately after the high-temperature and high-humidity exposure reliability test and a line horizontally extending from a value on the vertical axis of the graph which corresponds to the resistivity of the liquid crystal layer LQ of example 1 immediately after the high-temperature and high-humidity exposure reliability test).

In example 1, the resistivity of the alignment film AL1 immediately after the high-temperature and high-humidity exposure reliability test fell within the range of $1\times10^{11}$ to $1\times10^{12}$ Ω·cm, and that of the liquid crystal layer LQ immediately after the high-temperature and high-humidity exposure reliability test fell within the range of $1\times10^{11}$ to $1\times10^{12}$ Ω·cm.

Point P2$s$ is a point indicating both the resistivities of the alignment film AL1 and the liquid crystal layer LQ of comparative example 1 immediately before the high-temperature and high-humidity exposure reliability test (i.e., point P2$s$ is a point of intersection of a line vertically extending from a value on the horizontal axis of the graph which corresponds to the resistivity of the alignment film AL1 of comparative example 1 immediately before the high-temperature and high-humidity exposure reliability test and a line horizontally extending from a value on the vertical axis of the graph which corresponds to the resistivity of the liquid crystal layer LQ of comparative example 1 immediately before the high-temperature and high-humidity exposure reliability test). In other words, point P2$s$ is a point indicating both the resistivities of the alignment film AL1 and the liquid crystal layer LQ of comparative example 1 immediately after manufacturing of the liquid crystal display device of DSP of comparative example 1 (i.e., point P2$s$ is a point of intersection of a line vertically extending from a value on the horizontal axis of the graph which corresponds to the resistivity of the alignment film AL1 of comparative example 1 immediately after manufacturing of the liquid crystal display device of DSP of comparative example 1 and a line horizontally extending from a value on the vertical axis of the graph which corresponds to the resistivity of the liquid crystal layer LQ of comparative example 1 immediately after manufacturing of the liquid crystal display device of DSP of example 1). Thus, point P2$s$ indicates initial resistivities of the alignment film AL1 and the liquid crystal layer LQ of comparative example 1.

In comparative example 1, the initial resistivity of the alignment film AL1 falls within the range of $1\times10^{13}$ to $1\times10^{14}$ Ω·cm, and that of the liquid crystal layer LQ is $1\times10^{13}$ Ω·cm.

Point P2$e$ is a point indicating both the resistivities of the alignment film AL1 and the liquid crystal layer LQ of comparative example 1 immediately after the high-temperature and high-humidity exposure reliability test (i.e., point P1$s$ is a point of intersection of a line vertically extending from a value on the horizontal axis of the graph which corresponds to the resistivity of the alignment film AL1 of comparative example 1 immediately after the high-temperature and high-humidity exposure reliability test and a line horizontally extending from a value on the vertical axis of the graph which corresponds to the resistivity of the liquid crystal layer LQ of comparative example 1 immediately after the high-temperature and high-humidity exposure reliability test).

In comparative example 1, the resistivity of the alignment film AL1 immediately after the high-temperature and high-humidity exposure reliability test fell within the range of $1\times10^{10}$ to $1\times10^{11}$ Ω·cm, and that of the liquid crystal layer LQ immediately after the high-temperature and high-humidity exposure reliability test fell within the range of $1\times10^{11}$ to $1\times10^{12}$ Ω·cm.

As can be also seen from FIG. 5, in the case where the liquid crystal display device DSP is put in an atmosphere having a high temperature and a high humidity, the resistivity of the alignment film AL1 and that of the liquid crystal layer LQ lower with the passage of time.

The variation of a voltage applied to the liquid crystal layer LQ in a holding period in the low-frequency driving is denoted by $\Delta V$. The voltage variation corresponds to a variation of a voltage applied to the liquid crystal layer LQ, which occurs from the start of a single frame to the end of the single frame, in the case where a reference voltage at a reference brightness (halftone) is 1.

In the liquid crystal display device DSP of example 1, during the high-temperature and high-humidity exposure reliability test, the formula $-0.25 \leq \Delta V < 0.05$ was satisfied. To be more specific, in example 1, the resistivity of the alignment film AL1 was set high in advance, whereby the voltage variation $\Delta V$ did not become greater than or equal to 0.15 or less than $-0.35$. Thus, in example 1, after the high-temperature and high-humidity exposure reliability test was conducted on the liquid crystal display device DSP, it was possible to prevent the resistivity of the alignment film AL1 from being excessively lowered, and also reduce occurrence of flicker even in the low-frequency driving.

As can be seen from the above, it is preferable that the alignment film AL1 have a higher initial resistivity. If the alignment film AL1 has a resistivity of $5 \times 10^{11}$ $\Omega \cdot cm$ or more, it is possible to sufficiently reduce occurrence of flicker. It should be noted that in the case where $\Delta V < -0.35$ or $0.15 \leq \Delta V$, when the low-frequency driving is performed in the liquid crystal display device DSP, flicker occurs.

By contrast, in comparative example 1 of the liquid crystal display device DSP, during the high-temperature and high-humidity exposure reliability test, the formula $-0.65 \leq \Delta V < 0.15$ was satisfied. Immediately after the high-temperature and high-humidity exposure reliability test, the formula $-0.65 \leq \Delta V < -0.35$ was satisfied, and when the low-frequency driving was performed, flicker occurred. It was found that flicker easily occurs at the time of making a halftone display, and flicker worsens in level with the passage of time in the high-temperature and high-humidity exposure reliability test.

EXAMPLE 2

The liquid crystal display device DSP of example 2 will be described.

In example 2, the initial resistivity of the alignment film AL1 of the liquid crystal display device DSP is $5 \times 10^{14}$ $\Omega \cdot cm$ or more. The alignment film AL1 is formed of material which does not cause a conductive carrier to be produced by light. For example, the alignment film AL1 is formed of material containing a diamine component. Also, in example 2, the alignment film AL2 is formed in the same manner as the alignment film AL1. The initial resistivity of the liquid crystal layer LQ of example 1 is $1 \times 10^{13}$ $\Omega \cdot cm$ or more, whereas that of the liquid crystal layer LQ of example 2 is $1 \times 10^{13}$ $\Omega \cdot cm$.

FIG. 6 is a view indicating as a table whether the brightness of the display became non-uniform or not with respect to each of the liquid crystal display device DSP of example 2 and the liquid crystal display device of comparative example 2, in connection with the drive state of the backlight unit BL and the drive state of the liquid crystal display panel PNL. FIG. 6 indicates whether the brightness of the display became non-uniform or not in a high-temperature operation reliability test. It should be noted that the high-temperature operation reliability test is a test for examining whether the brightness of the display became non-uniform or not in the liquid crystal display device DSP, with the liquid crystal display panel PNL driven at a low frequency and the backlight unit BL driven, immediately after the liquid crystal display device DSP is driven at the reference frame frequency for 500 hours in an atmosphere having a temperature of 70° C. and a humidity having less than 10%. It should be noted that the liquid crystal display device of comparative example 2 has the same structure as the liquid crystal display device of example 2, except that the alignment film is formed of material which causes a conductive carrier to be generated by light.

As illustrated in FIG. 6, in 500 hours in the high-temperature operation reliability test, as the drive states of the backlight unit BL, the following states are present: the backlight unit BL is driven to illuminate the liquid crystal display panel PNL; and the backlight unit BL is driven not to illuminate the liquid crystal display panel PNL. Also, in 500 hours in the high-temperature operation reliability test, as the drive states of the liquid crystal display panel PNL, the following states are present: the liquid crystal display panel PNL is driven at a standard frame frequency; and the backlight unit BL is not driven.

As can be seen from FIG. 6, in the liquid crystal display device DSP of example 2, the brightness of the display did not become non-uniform even immediately after the liquid crystal display panel PNL was continuously illuminated or driven under a high-temperature environment for a long time period. As described above, the alignment film AL1 of example 2 is formed of material which does not cause a conductive carrier to be generated by light, whereby even if the alignment film AL1 was illuminated by the backlight, for example, at the interface between the alignment film AL1 and pixel electrode PE, a conductive carrier itself was not produced by light. Thus, the liquid crystal layer LQ was not adversely affected by a conductive carrier. Accordingly the brightness of the display did not become non-uniform.

Also, in the liquid crystal display device DSP of example 2, flicker did not occur even when in a halftone display, a frame was changed to another frame, immediately after the liquid crystal display panel PNL was continuously illuminated or driven under a high-temperature environment for a long time period.

By contrast, in the liquid crystal display device DSP of comparative example 2, according to the result of the high-temperature operation reliability test, the brightness of the display became non-uniform, in the case where the liquid crystal display panel PNL was driven at a low frequency immediately after continuously illuminated under a high-temperature environment for a long time period. It should be noted that in the case where the liquid crystal display panel PNL was not continuously illuminated, the brightness of the display did not become non-uniform. As described above, the alignment film of comparative example 2 is formed of material which causes a conductive carrier to be produced by light. Thus, in the case where the alignment film AL1 is illuminated by the backlight, for example, at the interface between the alignment film AL1 and the pixel electrodes PE, a conductive carrier produced by light is produced, and a DC component produced by the conductive carrier is supplied to the liquid crystal layer LQ, as a result of which the brightness of the display becomes non-uniform.

It can be found from the above that the non-uniformity of the brightness of the display is caused mainly by continuous illumination of the alignment film; that is, the brightness of the display is not influenced by driving of the liquid crystal display panel PNL or it is hardly influenced thereby.

EXAMPLE 3

The liquid crystal display device DSP of example 3 will be described.

FIG. 7 is a graph indicating (1) how the resistivities of an alignment film AL1 and a liquid crystal layer LQ of the liquid crystal display device DSP of example 3 varied, and (2) how the resistivities of an alignment film and a liquid crystal layer of a liquid crystal display device of comparative example 3 varied. To be more specific, FIG. 7 indicates how the resistivities of the alignment films and liquid crystal layers varied in a high-temperature and high-humidity exposure reliability test. The high-temperature and high-humidity exposure reliability test is a test in which the liquid crystal display device DSP is put in an atmosphere having a temperature of 65° C. and a humidity of 90% for 250 hours to examine the resistivity of the alignment film, that of the liquid crystal layer and a voltage variation ΔV to be described later. The resistivity of the alignment film, that of the liquid crystal layer and the voltage variation ΔV were examined in both the case where the liquid crystal display device DSP was put in an environment the temperature of which was set to room temperature (27° C.) and the case where the liquid crystal display device DSP was put in an environment the temperature of which was set to a high temperature (60° C.). It should be noted that the liquid crystal display device of comparative example 3 has the same structure as the liquid crystal display device of example 3, except for the resistivity of the liquid crystal layer.

As illustrated in FIG. 7, points P3s, P3e, P4s, P4e, P5s, P5e, P6s and P6e are plotted.

Point P3s is a point indicating both the resistivity of the alignment film AL1 and that of the liquid crystal layer LQ of the liquid crystal display device DSP of example 3 immediately before the high-temperature and high-humidity exposure reliability test, in the case where the liquid crystal display device DSP of example 3 was put in the environment of room temperature (27° C.) (i.e., point P3s is a point of intersection of a line vertically extending from a value on the horizontal axis of the graph which corresponds to the resistivity of the alignment film AL1 of example 3 immediately before the high-temperature and high-humidity exposure reliability test and a line horizontally extending from a value on the vertical axis of the graph which corresponds to the resistivity of the liquid crystal layer LQ of example 3 immediately before the high-temperature and high-humidity exposure reliability test, in the case where the liquid crystal display device DSP of example 3 was put in the environment of the room temperature (27° C.). In other words, point P3s is a point indicating both the resistivities of the alignment film AL1 and the liquid crystal layer LQ of example 3 in the environment of room temperature immediately after manufacturing of the liquid crystal display device DSP of example 3 (i.e., point P1s is a point of intersection of a line vertically extending from a value on the horizontal axis of the graph which corresponds to the resistivity of the alignment film AL1 of example 3 in the environment of the room temperature immediately after manufacturing of the liquid crystal display device of DSP of example 3 and a line horizontally extending from a value on the vertical axis of the graph which corresponds to the resistivity of the liquid crystal layer LQ of example 3 in the environment of the room temperature immediately after manufacturing of the liquid crystal display device of DSP of example 3). Thus, point P3s indicates the initial resistivities of the alignment film AL1 and liquid crystal layer LQ of example 3 in the environment of the room temperature.

In example 3, the initial resistivity of the alignment film AL1 in the environment of the room temperature is $5 \times 10^{14}$ Ω·cm, and that of the liquid crystal layer LQ in the environment of the room temperature is $1 \times 10^{14}$ Ω·cm. Also, in example 3, the alignment film AL2 is formed in the same manner as the alignment film AL1.

Point P3e is a point indicating both the resistivity of the alignment film AL1 and that of the liquid crystal layer LQ of the liquid crystal display device DSP of example 3 immediately after the high-temperature and high-humidity exposure reliability test, in the case where the liquid crystal display device DSP of example 3 was put in the environment of the room temperature (i.e., point P3e is a point of intersection of a line vertically extending from a value on the horizontal axis of the graph which corresponds to the resistivity of the alignment film AL1 of example 3 immediately after the high-temperature and high-humidity exposure reliability test and a line horizontally extending from a value on the vertical axis of the graph which corresponds to the resistivity of the liquid crystal layer LQ of example 3 immediately after the high-temperature and high-humidity exposure reliability test, in the case where the liquid crystal display device DSP of example 3 was put in the environment of the room temperature).

In example 3, the resistivity of the alignment film AL1 in the environment of the room temperature immediately after the high-temperature and high-humidity exposure reliability test fell within the range of $1 \times 10^{12}$ to $1 \times 10^{13}$ Ω·cm, and that of the liquid crystal layer LQ in the environment of the room temperature immediately after the high-temperature and high-humidity exposure reliability test fell within the range of $1 \times 10^{12}$ to $1 \times 10^{13}$ Ω·cm.

Point P4s is a point indicating both the resistivity of the alignment film AL1 and that of the liquid crystal layer LQ in example 3 of the liquid crystal display device DSP immediately before the high-temperature and high-humidity exposure reliability test, in the case where example 3 of the liquid crystal display device DSP was put in the environment of the high temperature (60° C.) (i.e., point P4s is a point of intersection of a line vertically extending from a value on the horizontal axis of the graph which corresponds to the resistivity of the alignment film AL1 of example 3 immediately before the high-temperature and high-humidity exposure reliability test and a line horizontally extending from a value on the vertical axis of the graph which corresponds to the resistivity of the liquid crystal layer LQ of example 3 immediately before the high-temperature and high-humidity exposure reliability test, in the case where the liquid crystal display device DSP of example 3 was put in the environment of the high temperature (60° C.)). In other words, point P4s is a point indicating both the resistivities of the alignment film AL1 and the liquid crystal layer LQ of example 3 in the environment of the high temperature immediately after manufacturing of the liquid crystal display device DSP of example 3 (i.e., point P4s is a point of intersection of a line vertically extending from a value on the horizontal axis of the graph which corresponds to the resistivity of the alignment film AL1 of example 3 in the environment of the high temperature immediately after the liquid crystal display device of DSP of example 3 has been manufactured and a line horizontally extending from a value on the vertical axis of the graph which corresponds to the resistivity of the liquid crystal layer LQ of example 3 in the environment of the high temperature immediately after manufacturing of the liquid crystal display device of DSP of example 3). Thus, point P4s indicates the initial resistivities of the alignment film AL1 and liquid crystal layer LQ of example 3 in the environment of the high temperature.

In example 3, the initial resistivity of the alignment film AL1 in the environment of the high temperature was $5 \times 10^{14}$ Ω·cm, and that of the liquid crystal layer LQ in the environment of the high temperature was above $1 \times 10^{13}$ Ω·cm and below $1 \times 10^{14}$ Ω·cm.

Point P4e is a point indicating both the resistivity of the alignment film AL1 and that of the liquid crystal layer LQ of the liquid crystal display device DSP of example 3 immediately after the high-temperature and high-humidity exposure reliability test, in the case where the liquid crystal display device DSP of example 3 was put in the environment of the high temperature (i.e., point P4e is a point of intersection of a line vertically extending from a value on the horizontal axis of the graph which corresponds to the resistivity of the alignment film AL1 of example 3 in the environment of the high temperature immediately after the high-temperature and high-humidity exposure reliability test and a line horizontally extending from a value on the vertical axis of the graph which corresponds to the resistivity of the liquid crystal layer LQ of example 3 in the environment of the high temperature immediately after the high-temperature and high-humidity exposure reliability test).

In example 3, the resistivity of the alignment film AL1 in the environment of the high temperature immediately after the high-temperature and high-humidity exposure reliability test fell within the range of $1 \times 10^{12}$ to $1 \times 10^{13}$ Ω·cm, and that of the liquid crystal layer LQ in the environment of the high temperature immediately after the high-temperature and high-humidity exposure reliability test fell within the range of $1 \times 10^{12}$ to $1 \times 10^{13}$ Ω·cm.

Point P5s is a point indicating both the resistivity of the alignment film AL1 and that of the liquid crystal layer LQ of the liquid crystal display device DSP of comparative example 3 immediately before the high-temperature and high-humidity exposure reliability test, in the case where the liquid crystal display device DSP of comparative example 3 was put in the environment of the room temperature (27° C.) (i.e., point P5s is a point of intersection of a line vertically extending from a value on the horizontal axis of the graph which corresponds to the resistivity of the alignment film AL1 of comparative example 3 immediately before the high-temperature and high-humidity exposure reliability test and a line horizontally extending from a value on the vertical axis of the graph which corresponds to the resistivity of the liquid crystal layer LQ of comparative example 3 immediately before the high-temperature and high-humidity exposure reliability test, in the case where the liquid crystal display device DSP of comparative example 3 was put in the environment of the room temperature (27° C.)). In other words, point P5s is a point indicating both the resistivities of the alignment film AL1 and the liquid crystal layer LQ of comparative example 3 in the environment of the room temperature immediately after manufacturing of the liquid crystal display device DSP of comparative example 3 (i.e., point P5s is a point of intersection of a line vertically extending from a value on the horizontal axis of the graph which corresponds to the resistivity of the alignment film AL1 of comparative example 3 in the environment of the room temperature immediately after manufacturing of the liquid crystal display device of DSP of comparative example 3 and a line horizontally extending from a value on the vertical axis of the graph which corresponds to the liquid crystal layer LQ of comparative example 3 in the environment of the room temperature immediately after manufacturing of the liquid crystal display device of DSP of comparative example 3). Thus, point P5s indicates the initial resistivities of the alignment film AL1 and liquid crystal layer LQ of comparative example 3 in the environment of the room temperature.

In comparative example 3, the initial resistivity of the alignment film AL1 in the environment of the room temperature was $5 \times 10^{14}$ Ω·cm, and that of the liquid crystal layer LQ in the environment of room temperature was $1 \times 10^{13}$ Ω·cm.

Point P5e is a point indicating both the resistivity of the alignment film AL1 and that of the liquid crystal layer LQ of the liquid crystal display device DSP of comparative example 3 immediately after the high-temperature and high-humidity exposure reliability test, in the case where the liquid crystal display device DSP of comparative example 3 is placed in the environment of room temperature (i.e., point P5e is a point of intersection of a line vertically extending from a value on the horizontal axis of the graph which corresponds to the resistivity of the alignment film AL1 of comparative example 3 immediately after the high-temperature and high-humidity exposure reliability test and a line horizontally extending from a value on the vertical axis of the graph which corresponds to the liquid crystal layer LQ of comparative example 3 immediately after the high-temperature and high-humidity exposure reliability test, in the case where the liquid crystal display device DSP of comparative example 3 is placed in the environment of room temperature).

In comparative example 3, the resistivity of the alignment film AL1 in the environment of the room temperature immediately after the high-temperature and high-humidity exposure reliability test fell within the range of $1 \times 10^{12}$ to $1 \times 10^{13}$ Ω·cm, and that of the liquid crystal layer LQ in the environment of the room temperature immediately after the high-temperature and high-humidity exposure reliability test was above $1 \times 10^{12}$ Ω·cm and below $1 \times 10^{13}$ Ω·cm.

Point P6s is a point indicating both the resistivity of the alignment film AL1 and that of the liquid crystal layer LQ of the liquid crystal display device DSP of comparative example 3 immediately before the high-temperature and high-humidity exposure reliability test, in the case where the liquid crystal display device DSP of comparative example 3 was put in the environment of the high temperature (60° C.) (i.e., point P6s is a point of intersection of a line vertically extending from a value on the horizontal axis of the graph which corresponds to the resistivity of the alignment film AL1 of comparative example 3 immediately before the high-temperature and high-humidity exposure reliability test and a line horizontally extending from a value on the vertical axis of the graph which corresponds to the resistivity of the liquid crystal layer LQ of comparative example 3 immediately before the high-temperature and high-humidity exposure reliability test, in the case where the liquid crystal display device DSP of comparative example 3 was put in the environment of the high temperature (60° C.)). In other words, point P6s is a point indicating both the resistivities of the alignment film AL1 and the liquid crystal layer LQ of comparative example 3 in the environment of the high temperature immediately after manufacturing of the liquid crystal display device DSP of comparative example 3 (i.e., point P6s is a point of intersection of a line vertically extending from a value on the horizontal axis of the graph which corresponds to the resistivity of the alignment film AL1 of comparative example 3 in the environment of the high temperature immediately after manufacturing of the liquid crystal display device of DSP of comparative example 3 and a line horizontally extending from a value on the vertical axis of the graph which corresponds to the resistivity of the liquid crystal layer LQ of comparative example 3 in the environment of the high temperature immediately after manufacturing of the liquid crystal display device of DSP of comparative example 3). Thus, point P6s indicates the initial resistivities of the alignment film AL1 and liquid crystal layer LQ of comparative example 3 in the environment of the high temperature.

In comparative example 3, the initial resistivity of the alignment film AL1 in the environment of the high temperature was $5 \times 10^{14}$ Ω·cm, and that of the liquid crystal layer LQ in the environment of the high temperature was above $1 \times 10^{12}$ Ω·cm and below $1 \times 10^{13}$ Ω·cm.

Point P6e is a point indicating both the resistivity of the alignment film AL1 and that of the liquid crystal layer LQ of the liquid crystal display device DSP of comparative example 3 immediately after the high-temperature and high-humidity exposure reliability test, in the case where the liquid crystal display device DSP comparative example 3 was put in the environment of the high temperature (i.e., point P6e is a point of intersection of a line vertically extending from a value on the horizontal axis of the graph which corresponds to the resistivity of the alignment film AL1 of comparative example 3 immediately after the high-temperature and high-humidity exposure reliability test and a line horizontally extending from a value on the vertical axis of the graph which corresponds to the resistivity of the liquid crystal layer LQ of comparative example 3 immediately after the high-temperature and high-humidity exposure reliability test, in the case where the liquid crystal display device DSP of comparative example 3 was put in the environment of the high temperature).

In comparative example 3, the resistivity of the alignment film AL1 in the environment of the high temperature immediately after the high-temperature and high-humidity exposure reliability test fell within the range of $1 \times 10^{12}$ to $1 \times 10^{13}$ Ω·cm, and that of the liquid crystal layer LQ in the environment of the high temperature immediately after the high-temperature and high-humidity exposure reliability test fell within the range of $1 \times 10^{11}$ to $1 \times 10^{12}$ Ω·cm.

As can be also seen from FIG. 7, in the case where the liquid crystal display device DSP is put in an atmosphere having a high temperature and a high humidity, the resistivity of the alignment film AL1 and that of the liquid crystal layer LQ lower with the passage of time.

In the liquid crystal display device DSP of example 3, in the case where the liquid crystal display device DSP was put in the environment of the room temperature, during the high-temperature and high-humidity exposure reliability test, the formula $-0.05 \leq \Delta V < 0.15$ was satisfied, and in the case where the liquid crystal display device DSP was put in the environment of the high temperature, during the high-temperature and high-humidity exposure reliability test, the formula $-0.05 \leq \Delta V < 0.05$ was satisfied. The voltage variation $\Delta V$ did not become equal to or greater than 0.15 or less than $-0.35$, by setting not only the resistivity of the alignment film AL1 but that of the liquid crystal layer LQ at a high value in advance.

Thus, in example 3, after the high-temperature and high-humidity exposure reliability test was conducted on the liquid crystal display device DSP, it was possible to prevent both the resistivities of the alignment film AL1 and the liquid crystal layer LQ from being excessively lowered, and also reduce occurrence of flicker even in the low-frequency driving.

As can be seen from the above, in the case where the initial resistivity of the alignment film AL1 is set to $5 \times 10^{14}$ Ω·cm or more, it is preferable that the liquid crystal layer LQ have a higher initial resistivity. If the liquid crystal layer LQ has a resistivity of $1 \times 10^{14}$ Ω·cm or more, it is possible to improve a high-temperature and high-humidity resistance of the liquid crystal display panel PNL, and further reduce occurrence of flicker. In this case also, in the case where $\Delta V < -0.35$ or $0.15 \leq \Delta V$, when the low-frequency driving is performed in the liquid crystal display device DSP, flicker occurs.

In the liquid crystal display device DSP of comparative example 3, in the case where the liquid crystal display device DSP was put in the environment of the room temperature, during the high-temperature and high-humidity exposure reliability test, the formula $-0.25 \leq \Delta V < 0.05$ was satisfied, in the case where the liquid crystal display device DSP was put in the environment of the high temperature, during the high-temperature and high-humidity exposure reliability test, the formula $-0.65 \leq \Delta V < -0.05$ was satisfied, and in the case where the liquid crystal display device DSP was put in the environment of the high temperature, immediately after the high-temperature and high-humidity exposure reliability test, the formula $-0.65 \leq \Delta V < -0.35$ was satisfied, and when the low-frequency driving was performed, flicker occurred. Also, it was found that flicker easily occurs at the time of making a halftone display, and the flicker worsens in level with the passage of time in the high-temperature and high-humidity exposure reliability test.

Thus, in the case where the resistivity of the alignment film AL1 in the environment of the room temperature is set to $5 \times 10^{14}$ Ω·cm or more, preferably, the resistivity of the liquid crystal layer LQ in the environment of the room temperature should be set to $1 \times 10^{13}$ Ω·cm or more, and more preferably the resistivity of the liquid crystal layer LQ in the environment of the room temperature should be set to $1 \times 10^{14}$ Ω·cm or more.

According to the embodiment, the liquid crystal display device DSP having the above structure comprises: the liquid crystal display panel PNL which includes the pixel electrodes PE, the liquid crystal layer LQ and the alignment film AL1 which is located between the pixel electrodes PE and the liquid crystal layer LQ and in contact with the liquid crystal layer LQ; and the driver which drives the pixel electrodes PE at a drive frequency which falls within the range of 1 to 20 Hz. The liquid crystal display device DSP adopts the FFS mode as a display mode, and the liquid crystal layer LQ is formed of a negative liquid crystal material. Therefore, in the above liquid crystal display device DSP, the modulation percentage of polarized light is high, and the transmittance of light is high.

It should be noted that as compared with the case where the liquid crystal layer LQ is formed of a positive liquid crystal material, in the case where the liquid crystal layer LQ is formed of a negative liquid crystal material, the resistivity of the liquid crystal layer LQ is low, and the holding rate of a voltage applied to the liquid crystal layer LQ is easily lowered. Also, in the case where the above liquid crystal display panel PNL is driven at a low frequency of 1 to 20 Hz, flicker easily occurs.

In view of the above, in the embodiment, the resistivity of the alignment film AL1 is set to $5 \times 10^{14}$ Ω·cm or more. It is possible to reduce lowering of the holding rate of the voltage applied to the liquid crystal layer LQ and also reduce occurrence of flicker, by setting the initial resistivity of the alignment film AL1 at a high value, not by selecting material of which the alignment film is to be formed.

It should be note that the amount of lowering of the resistivity of the alignment film AL1 with respect to the amount of water which enters the liquid crystal display panel PNL from the outside thereof does not greatly depend on the material of the alignment film. Also, the amount of the water entering the liquid crystal display panel PNL depends on a perimeter structure of the liquid crystal display panel PNL itself.

The liquid crystal display device DSP comprises the backlight unit BL which illuminates the liquid crystal display panel PNL. It is preferable that the resistivity of the alignment film AL1 be set to a high value, and in addition, the alignment film AL1 be formed of material which does not cause a conductive carrier to be produced by light such as backlight. At the interface between the alignment film AL1 and each of the pixel electrodes PE, a conductive carrier itself is not produced by light. Thus, even when the liquid crystal display panel PNL is driven at a low frequency, it is possible to reduce occurrence of non-uniformity of the brightness of the display.

The liquid crystal layer LQ has a resistivity of $1\times10^{13}$ $\Omega\cdot cm$ or more. It is preferable that the resistivity of the liquid crystal layer LQ be greater than or equal to $1\times10^{14}$ $\Omega\cdot cm$. Even in the case where the liquid crystal display device DSP is put in a high-temperature and high-humidity environment, and thereafter used in a high-temperature environment, and the liquid crystal display panel PNL is driven at a low frequency, it is possible to reduce occurrence of flicker. In order that occurrence of flicker be reduced even if the temperature changes in a wide range, it is preferable that not only the resistivity of the alignment film AL1 but that of the liquid crystal layer LQ be set to a high value.

According to the embodiment having the above features, it is possible to obtain a liquid crystal display device DSP which can reduce lowering of a display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the liquid crystal display panel PNL according to the above embodiment has a structure adapted for the FFS mode which is a display mode; however, it may have a structure adapted for another display mode. For example, the liquid crystal display panel PNL may have a structure adapted for a mode primarily utilizing a longitudinal electric field substantially perpendicular to a main surface of each of the substrates, such as a vertical aligned (VA) mode. In the display mode utilizing the longitudinal electric field, for example, it is possible to apply a structure including an array substrate AR provided with pixel electrodes PE and a counter-substrate CT provided with a common electrode COM. In this case, the common electrode COM is located opposite to the liquid crystal layer LQ with respect to the alignment film AL2, and is in contact with the alignment film AL2.

The above embodiment is not limited to the above liquid crystal display devices; that is, it can be applied to various types of liquid crystal display devices. Needless to say, the above embodiment can be applied to middle or small liquid crystal display devices and large liquid crystal display devices without particular limitation.

What is claimed is:

1. A liquid crystal display device comprising:
a liquid crystal display panel which includes a pixel electrode, a liquid crystal layer and an alignment film which is located between the pixel electrode and the liquid crystal layer, which is in contact with the liquid crystal layer, and which is of a lateral-electric-field type; and
a driver which drives the pixel electrode at a drive frequency of 1 to 20 Hz,
wherein the alignment film has an initial resistivity of $5\times10^{14}$ $\Omega\cdot cm$ or more at a temperature of 27° C.,
the alignment film which has been put in an atmosphere having a temperature of 65° C. and a humidity of 90% for 500 hours has a resistivity within a range of $1\times10^{11}$ to $1\times10^{12}$ $\Omega\cdot cm$,
a formula $-0.25\leq\Delta V<0.05$ is satisfied wherein $\Delta V$ is a variation of a voltage applied to the liquid crystal layer in a holding period at the drive frequency, and
the holding period is a period of time after writing of an image signal to the pixel electrode in a single frame period.

2. The liquid crystal display device of claim 1, wherein the liquid crystal layer is formed of a negative liquid crystal material.

3. The liquid crystal display device of claim 1, wherein the liquid crystal layer has an initial resistivity of $1\times10^{13}$ $\Omega\cdot cm$ or more at a temperature of 27° C., and
the liquid crystal layer which has been put in an atmosphere having a temperature of 65° C. and a humidity of 90% for 500 hours has a resistivity within a range of $1\times10^{11}$ to $1\times10^{12}$ $\Omega\cdot cm$.

4. The liquid crystal display device of claim 1, further comprising a common electrode,
wherein the pixel electrode is located between the common electrode and the alignment film, and
the alignment film is in contact with the pixel electrodes.

5. The liquid crystal display device of claim 1, further comprising a backlight unit which illuminates the liquid crystal display panel.

6. The liquid crystal display device of claim 5, wherein the alignment film is formed of material which does not cause a conductive carrier to be generated by light.

* * * * *